US011824876B2

(12) United States Patent
Bernardi et al.

(10) Patent No.: US 11,824,876 B2
(45) Date of Patent: Nov. 21, 2023

(54) ONLINE ANOMALY DETECTION OF VECTOR EMBEDDINGS

(71) Applicant: Extreme Networks, Inc., San Jose, CA (US)

(72) Inventors: Giacomo Bernardi, Varese (IT); Donagh Horgan, Cork (IE); Jeffrey W. Haskell, New Boston, NH (US); Markus Nispel, Boston, MA (US)

(73) Assignee: Extreme Networks, Inc., San Jose, CA (US)

( * ) Notice: Subject to any disclaimer, the term of this patent is extended or adjusted under 35 U.S.C. 154(b) by 99 days.

(21) Appl. No.: 16/778,585

(22) Filed: Jan. 31, 2020

(65) Prior Publication Data

US 2021/0243210 A1    Aug. 5, 2021

(51) Int. Cl.
*H04L 9/40*         (2022.01)
*G06F 21/55*        (2013.01)

(52) U.S. Cl.
CPC ............................ *H04L 63/1425* (2013.01)

(58) Field of Classification Search
CPC ............ H04L 63/1425; H04L 63/1408; H04L 63/1441; H04L 67/22; H04L 2463/121; G06F 21/552; G06F 21/566; G06N 20/00
See application file for complete search history.

(56) References Cited

U.S. PATENT DOCUMENTS

| 11,252,585 | B2 * | 2/2022 | Takahashi | ............. | H04W 24/04 |
| 2014/0269339 | A1 * | 9/2014 | Jaafar | ................... | H04L 41/142 |
| | | | | | 370/241 |
| 2017/0024660 | A1 * | 1/2017 | Chen | ...................... | G06F 21/552 |
| 2017/0289186 | A1 * | 10/2017 | Staniford | ............ | H04L 63/1425 |

(Continued)

FOREIGN PATENT DOCUMENTS

WO    WO 2017/087840 A1    5/2017

OTHER PUBLICATIONS

Fu at el., "FSAD: Flow Similarity Analysis for Anomaly Detection in Cloud Applications," 2015 IEEE 7th International Conference on Cloud Computing Technology and Science (CloudCom) Year: 2015 | Conference Paper | Publisher: IEEE.*

(Continued)

*Primary Examiner* — Roderick Tolentino
(74) *Attorney, Agent, or Firm* — Sterne, Kessler, Goldstein & Fox P.L.L.C.

(57) ABSTRACT

Disclosed herein are system, method, and computer program product embodiments for providing an anomaly detection system. Some aspects of this disclosure include a method for detecting anomaly in a network device. The method includes determining one or more similarity values between a flow vector corresponding to a flow associated with the network device and one or more flow clusters associated with the network device. The method further includes determining a maximum similarity value as a maximum of the one or more similarity values and comparing the maximum similarity value to a threshold. The method also includes, in response to the maximum similarity value being equal to or greater than the threshold, updating a flow cluster associated with the maximum similarity value. The method also includes, in response to the maximum similarity measure being less than the threshold, detecting the anomaly in the network device.

20 Claims, 10 Drawing Sheets

(56) References Cited

U.S. PATENT DOCUMENTS

| | | | |
|---|---|---|---|
| 2018/0278496 A1 | 9/2018 | Kulshreshtha et al. | |
| 2018/0287907 A1 | 10/2018 | Kulshreshtha et al. | |
| 2019/0020671 A1 | 1/2019 | Komárek et al. | |
| 2019/0190791 A1 | 6/2019 | Bernardi et al. | |
| 2019/0238578 A1* | 8/2019 | Wittenschlaeger | H04L 63/18 |
| 2019/0394215 A1 | 12/2019 | Lee et al. | |
| 2020/0059480 A1* | 2/2020 | Junod | H04L 63/1425 |
| 2020/0175161 A1* | 6/2020 | Giaconi | G06N 5/003 |
| 2020/0374306 A1* | 11/2020 | Dai | H04L 41/145 |
| 2021/0243208 A1* | 8/2021 | Rubin | G06F 21/566 |
| 2021/0344569 A1* | 11/2021 | Su | H04L 41/142 |

OTHER PUBLICATIONS

Hu et al., "An anomaly detection model of user behavior based on similarity clustering," 2018 IEEE 4th Information Technology and Mechatronics Engineering Conference (ITOEC) Year: 2018 | Conference Paper | Publisher: IEEE.*

Haskell, Richard E., et al. "Finding pattern behavior in temporal data using fuzzy clustering." Intelligent Engineering Systems Through Artificial Neural Networks 10 (2000): 703-711.

Masson, Charles, Jee E. Rim, and Homin K. Lee. "DDSketch: A fast and fully-mergeable quantile sketch with relative-error guarantees." arXiv preprint arXiv:1908.10693 (2019).

Dunning, Ted, and Otmar Ertl. "Computing extremely accurate quantiles using t-digests." arXiv preprint arXiv:1902.04023(2019).

International Search Report and Written Opinion directed to related International Application No. PCT/US2021/014593, dated May 10, 2021, 12 pages.

Haskell et al., "Finding Pattern Behavior In Temporal Data Using Fuzzy Clustering," Intelligent Engineering Systems Through Artificial Neural Networks 10, Jan. 2000; pp. 1-9.

Masson et al., "DDSketch: A Fast and Fully-Mergeable Quantile Sketch with Relative-Error Guarantees," Proceedings of the VLDB Endowment, vol. 12, No. 12, Aug. 1, 2019; pp. 2195-2205.

Dunning et al., "Computing Extremely Accurate Quantiles Using t-Digests," arXiv Forum, Feb. 11, 2019; pp. 1-22.

* cited by examiner

Device A

| Flow 1 | 0.3 | 0.1 | 0.4 | 0.7 | 0.6 | 3.7 | 0.4 | 0.1 | 1.5 | 9.3 | 10.0 | 8.4 | |
|--------|-----|-----|-----|-----|-----|-----|-----|-----|-----|-----|------|-----|--|

201a

| Flow 2 | 3.6 | 5.6 | 7.8 | 2.5 | 6.7 | 3.2 | 3.4 | 6.7 | 4.2 | 0.1 | 0.3 | 9.4 | |

201b

| Flow 3 | 6.5 | 3.2 | 3.4 | 6.5 | 7.6 | 2.3 | 4.5 | 6.5 | 2.3 | 4.5 | 6.5 | 2.3 | |

201c

| Flow 4 | 3.4 | 6.7 | 5.2 | 4.5 | 0.7 | 15.2 | 34.5 | 1.3 | 4.5 | 6.2 | 8.5 | 8.3 | |

Flow Clusters for Device A

FC 1 (last seen at 2019-09-03 15:34:46)

| 0.3 | 0.1 | 0.4 | 0.7 | 0.6 | 3.7 | 0.4 | 0.1 | 1.5 | 9.3 | 10.0 | 8.4 |

FC 2 (last seen at 2019-09-03 12:08:12)

| 3.6 | 5.6 | 7.8 | 2.5 | 6.7 | 3.2 | 3.4 | 6.7 | 4.2 | 0.1 | 0.3 | 9.4 |

FC 3 (last seen at 2019-08-30 09:01:00)

| 6.5 | 3.2 | 3.4 | 6.5 | 7.6 | 2.3 | 4.5 | 6.5 | 2.3 | 4.5 | 6.5 | 2.3 |

FC 4 (last seen at 2019-09-03 15:34:46)

| 3.4 | 6.7 | 5.2 | 4.5 | 0.7 | 15.2 | 34.5 | 1.3 | 4.5 | 6.2 | 8.5 | 8.3 |

FIG. 4A

ONLINE ANOMALY DETECTION OF VECTOR EMBEDDINGS

BACKGROUND

Field

The described embodiments generally relate to anomaly detection using vector data. For example, the embodiments of this disclosure relate to systems and methods for detecting anomaly in network devices using network flow data.

Related Art

To monitor network behavior of many network endpoint devices, a central server stores a myriad records of network flows for analysis. For example, systems can require storage of Netflow and Internet Protocol Flow Information Export ("IPFIX") records, Hypertext Transfer Protocol ("HTTP") proxy logs, and the like, in a "big data" backend for subsequent processing. This involves great expense, as storing these records requires use of large amounts of storage space and real estate to house the storage space (e.g., the "big data" facilities) is similarly expensive. This problem is exacerbated by the proliferation of gadgets and other devices becoming network-connected (e.g., Internet-of-Things devices), which increases the amount of network endpoints to be monitored, making it difficult to store network flows for network devices associated with behavior monitoring.

SUMMARY

Some aspects of this disclosure include apparatuses and methods for implementing anomaly detection using vector data. In some examples, the anomaly detection can include detecting anomaly in network devices using network flow data. The anomaly detection system of this disclosure can ingest one or more generic vector embeddings (e.g., vectors representing behavior of devices and/or flows) and detect anomalies in the devices. Additionally, the anomaly detection system of this disclosure can use minimal state. For example, the anomaly detection system of this disclosure can operate within storage/memory limits while providing results within accuracy requirements. Additionally, the anomaly detection system of this disclosure can be configured to use online-learning to include recent data into its "baseline." In some examples, the anomaly detection system of this disclosure can adapt (e.g., automatically) its sensitivity to the nature of data being ingested. Also, the anomaly detection system of this disclosure can enable a user to specify a minimum threshold for anomaly detection and alert confidence.

Some aspects of this disclosure relate to a method for detecting anomaly in a network device. The method includes receiving a flow vector corresponding to a flow associated with the network device and determining one or more similarity values between the flow vector and one or more flow clusters associated with the network device. The method also includes determining a maximum similarity value as a maximum of the one or more similarity values and comparing the maximum similarity value with a threshold. In response to the maximum similarity value being equal to or greater than the threshold, a flow cluster associated with the maximum similarity value is updated. In response to the maximum similarity measure being less than the threshold, the anomaly in the network device is detected.

Some aspects of this disclosure relate to a method including receiving a network flow associated with a network device and comparing the network flow to one or more flow clusters associated with the network device. The method also includes determining, based on the comparing and at a flow level, whether the network flow indicates an anomaly in a behavior of the network device.

Some aspects of this disclosure relate to a system including a memory and at least one processor coupled to the memory. The at least one processor is configured to determine one or more similarity values between a flow vector corresponding to a flow associated with a network device and one or more flow clusters associated with the network device. The at least one processor is further configured to determine a maximum similarity value as a maximum of the one or more similarity values compare the maximum similarity value to a threshold. In response to the maximum similarity value being equal to or greater than the threshold, the at least one processor is configured to update a flow cluster associated with the maximum similarity value. In response to the maximum similarity measure being less than the threshold, the at least one processor is configured to detect an anomaly in the network device and generate an alert message based on the detected anomaly.

Some aspects of this disclosure relate to a non-transitory computer-readable device having instructions stored thereon. When the instructions are executed by at least one computing device, the instructions cause the at least one computing device to perform operations. The operations include determining one or more similarity values between a flow vector corresponding to a flow associated with a network device and one or more flow clusters associated with the network device. The operations further include determining a maximum similarity value as a maximum of the one or more similarity values and comparing the maximum similarity value with a threshold. In response to the maximum similarity measure being less than the threshold, the operations include detecting an anomaly in the network device, generating a new flow cluster based on the flow vector, and associating a timestamp to the new flow cluster, the timestamp indicating a time that the new flow cluster is generated.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

FIG. 3A is an example illustration of four flow vectors, according to some embodiments.

FIG. 4A illustrates four flow clusters, according to some embodiments.

Figure 1:
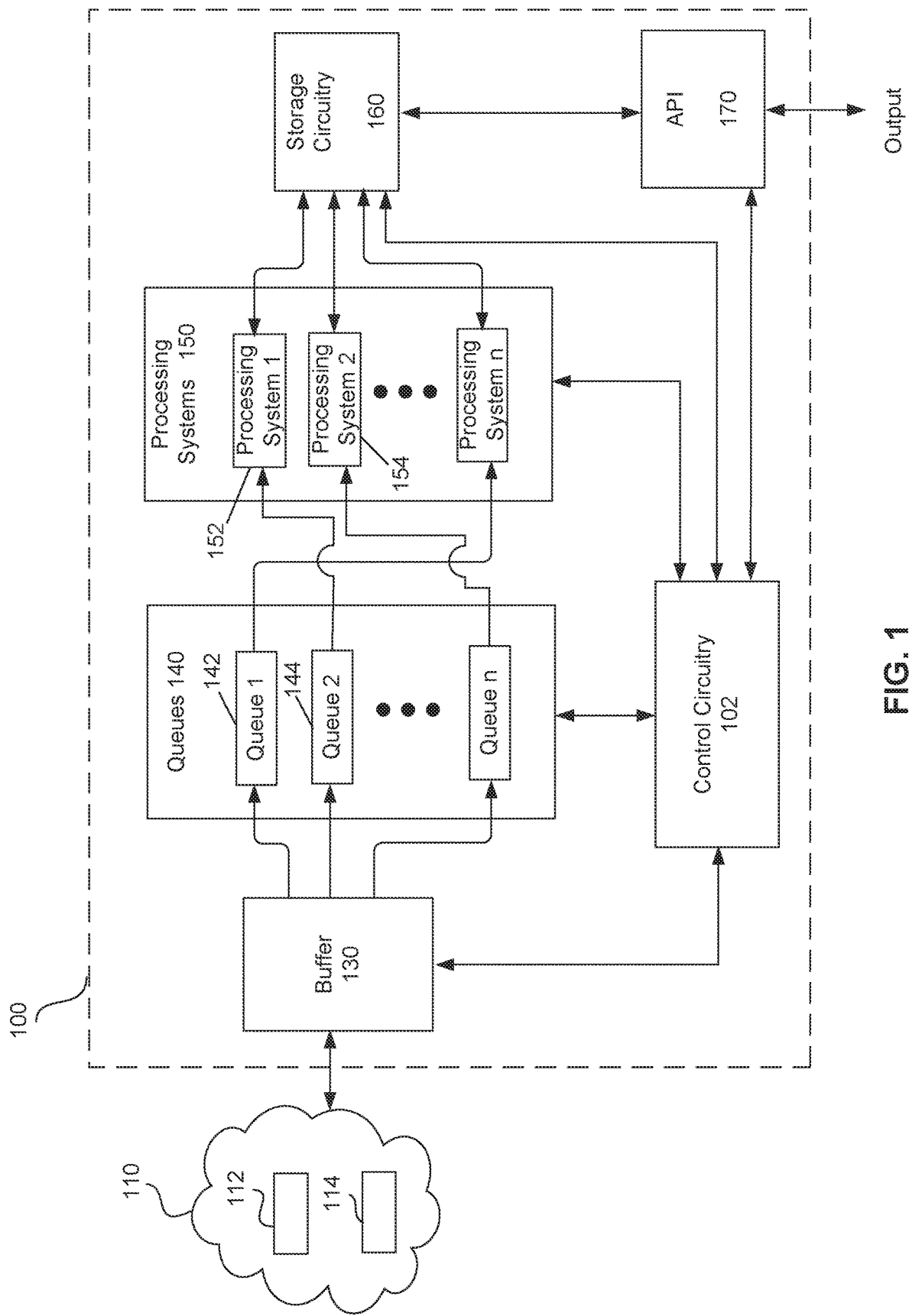
FIG. 1 illustrates an example system for generating vector representation of network behavior and detecting anomaly using vector data, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing functionality for implementing anomaly detection using vector data, FIG. 1 illustrates an example system 100 for generating vector representation of network behavior and detecting anomaly using vector data, according to some aspects of the disclosure. Example system 100 is provided for the purpose of illustration only and does not limit the disclosed embodiments. According to some embodiments, the anomaly detection system of this disclosure can be implemented with a system configured to track the behavior of one or more network devices (e.g., network endpoints) by, for example, modeling the behavior with a behavior model. Some aspects of the anomaly detection system of this disclosure can be used to perform anomaly detection of any type of vector data.

According to some aspects, system 100 can be configured to generate vector representation of network behavior. The network behavior can include the behavior of one or more network devices such as, but not limited to, network endpoints. In some aspects, system 100 can be configured to receive (e.g., ingest) one or more network flows and generate one or more flow vectors representing the behavior of a network device. The one or more network flows are from the network device and/or are going to the network device. The network flow represents nature of a network traffic and can include information such as, but not limited to, timestamps, amount of data (e.g., number of bytes) being sent and/or received, one or more descriptors of one or more applications associated with the network traffic, addresses of source and/or destination device, and the like.

In some examples, system 100 is configured to generate the one or more flow vectors as vector representations of the one or more network flows. For example, system 100 is configured to generate the one or more flow vectors from the one or more network flows using one or more machine learning algorithms. In some examples, the flow vector(s) can be a dense vector of floating-point number, which encapsulates the "meaning" of each network flow. In some examples, similar network flows (e.g., flows to the same destination, etc.) can correspond to nearby locations of a multi-dimensional space containing the flow vectors.

In addition to generating the flow vectors, system 100 is configured to analyze the flow vectors and determine/detect anomaly with the network device. As discussed in more detail, in some aspects of this disclosure, system 100 can be configured to receive the network flow associated with the network device and compare the network flow to one or more flow clusters associated with the network device. Based on this comparison and at the flow level (e.g., by operating on the network flow(s) and comparing the network flow(s) to flow cluster(s)), system 100 can determine whether the network flow indicates an anomaly in the behavior of the network device. In other words, system 100 can detect the anomaly in the behavior of the network device at the flow level by analyzing the network flow(s) and comparing them to flow cluster(s). In some examples, system 100 can generate and use the flow vector associated with the network device to make the comparison and the determination.

According to some aspects of this disclosure, system 100 can include control circuitry 102, one or more buffers 130, one or more queues 140, one or more processing systems 150, storage circuitry 160, and Application Program Interface ("API") 170. Illustrated systems are provided as exemplary parts of system 100, and system 100 can include other circuit(s) and subsystem(s). Also, although the systems of system 100 are illustrated as separate components, the embodiments of this disclosure can include any combination of these, less, or more components. For example, although system 100 is depicted as one system including several components, this is merely for convenience and the components of system 100 can be distributed across multiple servers and databases.

According to some aspects of this disclosure, system 100 is configured to model and/or detect anomaly in the behavior of the network devices of, for example, network 110. These network devices can include, but are not limited to, network endpoint 112 and network endpoint 114. In some examples, a network endpoint can be any end device, such as, but not limited to, a consumer electronics device (e.g., smartphone, personal computer, etc.), an Internet-of-Things device, or any other user-facing device that is connected to network 110.

According to some aspects of this disclosure, control circuitry 102 can receive records from network devices of network 110 (e.g., network device 112 and network device 114) by way of communications circuitry 120. Communications circuitry 120 can be any receiver, transmitter, transceiver, or any other means of transmitting and/or receiving data. As used herein, the term "record" can refer to logs of network activities. Examples of records are Netflow records, Internet Protocol Flow Information Export ("IPFIX") records, Hypertext Transfer Protocol ("HTTP") proxy logs, and the like. In some examples, each record identifies a single network flow. In some examples, control circuitry 102 can augment the records to include extra metadata, such as an application identifier, HTTP/HTTPs (HTTP Secure) header values, Transport Layer Security ("TLS") certificate details, and the like. Control circuitry 102 can augment the records through a fingerprinting process, and/or can perform this augmentation by ingesting bidirectional IPFIX records.

The records can be received at buffer 130. Control circuitry 102 can determine to which network device (e.g., network endpoint) each record corresponds. For example, control circuitry 102 can differentiate records that correspond to network endpoint 112 from records that correspond to network endpoint 114. Control circuitry 102 can then designate a different queue for each network endpoint, such that records corresponding to each different network endpoint are transmitted from buffer 130 to a designated queue of queues 140. As depicted in FIG. 1, records corresponding to network endpoint 112 can be transmitted to queue 142, and records corresponding to network endpoint 114 can be transmitted to queue 144. Control circuitry 102 can instantiate as many queues n as is necessary to use a dedicated queue for each network endpoint for which records are received. In some embodiments, queues 140 are FIFO queues. In other embodiments, queues 140 can be any other form of queue.

In some examples, control circuitry 102 schedules processing of the records in queues 140, where processing is performed by processing systems 150. In some examples, processing systems 150 are not dedicated to a given queue. As an example, queue 144 can be assigned to processing system 152 for processing, as depicted in FIG. 1. When any of processing systems 150 completes processing of the records from a given queue, the processing systems 150 can revert to an idle state. In some examples, control circuitry 102 identifies idle processing systems, and commands each idle processing system to process records from a specific queue. According to some examples, in selecting to which queue of queues 150 an idle processing system should be assigned, control circuitry can determine which queues are overflowing in size by determining which queues have a number of records that exceed a threshold. In some examples, the threshold is configured by a network administrator. In some embodiments, the threshold is a default value. Control circuitry 102 can prioritize queues that have a number of records that exceed the threshold by assigning idle processing systems to those queues first. Control circuitry can assign remaining idle processing systems based on any known load balancing scheme (e.g., based on which queues have the most records), or arbitrarily.

In some aspects of this disclosure, processing systems 150 generate a behavior model as a result of processing the records of a given queue of queues 140. A given processing system (e.g., processing system 154) can generate the behavior model by encoding data of the records into a multi-dimensional vector. In some examples, to encode the data, control circuitry 102 can instruct a processing system of processing system 150 (e.g., processing system 152) to extract data from a subset of fields of records of a given queue (e.g., queue 144). Control circuitry 102 can instruct the processing system (e.g., processing system 152) to generate a string from the extracted data. Control circuitry 102 can then concatenate the extracted data derived from the queue to form a document.

According to some aspects of this disclosure, after forming a document, control circuitry 102 can convert the document into a vector. For example, control circuitry 102 can feed the document into a word/document embedding algorithm (e.g., Document to Vector ("doc2vec"), FastText, and the like). In some examples, doc2vec algorithms can be based on Word to Vector ("word2vec") algorithms. When control circuitry 102 feeds the document into the doc2vec algorithm, control circuitry 102 can use a shallow neural network to generate a vector encoding for each word that appears in a given document, and for the document itself. In some examples, control circuitry 102 can implement a "Paragraph Vector Distributed Bag of Words" formulation of the doc2vec algorithm. This entails control circuitry 102 implementing a sliding window (e.g., of a configurable or default size) iterating over the document by selecting a subset of words of the document. Control circuitry 102 then applies a stochastic gradient descent to compute weights and biases that best fit the shallow neural network in predicting a target identifier for the endpoint. Control circuitry 102 then averages the set of weights for each word to compose a flow vector that represents the network device (e.g., the network endpoint) to which the document corresponds. The flow vector can be represented as an array of floating point values. In some non-limiting examples, the flow vector is formed of three-hundred to five-hundred floating point values.

It is noted that although some exemplary methods are provided for generating the flow vector from the network flow, aspects of this disclosure are not limited to these examples. And system 100 and/or control circuitry 102 can use other methods to generate the flow vector from the network flow representing the behavior of the network device (e.g., network endpoint such as network end point 112, 114).

Control circuitry 102 can cause each flow vector to be stored to memory by, for example, storage circuitry 160. Moreover, as described above, because the flow vectors are limited in size, behavior modeling is possible without use of a "big data" facility. There are additional advantages to avoiding storing the records themselves. For example, these records often include sensitive private information about users (e.g., personally-identifying information, financial information, and the like). Thus, if these records are inappropriately accessed (e.g., through a hacking or malware operation), legal and privacy issues can arise. The storage of a vector, as disclosed herein, rather than storing the records themselves, avoids these risks by avoiding storing such sensitive information, while still maintaining the ability to monitor the behavior of the network endpoint.

According to some examples, storage circuitry 160 can be any media capable of storing data. The computer readable media can be transitory, including, but not limited to, propagating electrical or electromagnetic signals, or can be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 102 can be based on any suitable processing circuitry, such as one or more microprocessors, microcontrollers, digital signal processors, programmable logic devices, field-programmable gate arrays (FPGAs), application-specific integrated circuits (ASICs), etc., and can include a multi-core processor (e.g., dual-core, quad-core, hexa-core, or any suitable number of cores) or supercomputer. In some embodiments, processing circuitry can be distributed across multiple separate processors or processing units, for example, multiple of the same type of processing units or multiple different processors. In some examples, control circuitry 102 executes instructions stored in memory (i.e., storage circuitry 160).

In some examples, following storage of the flow vector, control circuitry 102 can receive a request from a network administrator to view a given flow vector. Control circuitry 102 can respond to such a request by using Application Program Interface ("API") 170 to output a visual depiction of a behavior model.

In some examples, control circuitry 102 can track behavior of the network endpoint over time. For example, by performing a word/document embedding computation (e.g., Doc2Vec or FastText) for a given network endpoint periodically over time, control circuitry 102 can identify recurring patterns of the endpoint. Differences in network behavior would be indicated by a movement of a resulting vector from subsequent computations to a different position in multidimensional space. Control circuitry 102 can implement Kalman filters to track the point position over time, or derive a multivariate Gaussian distribution to determine the probability of the point corresponding to the network endpoint's behavior being in a given position of the multidimensional space, or use a recursive neural network to learn behavior change over time. Control circuitry 102 can determine, if the point is located in a region of low probability value, that the network endpoint is engaged in anomalous behavior, and can alert a network administrator of the anomaly.

Figure 2:
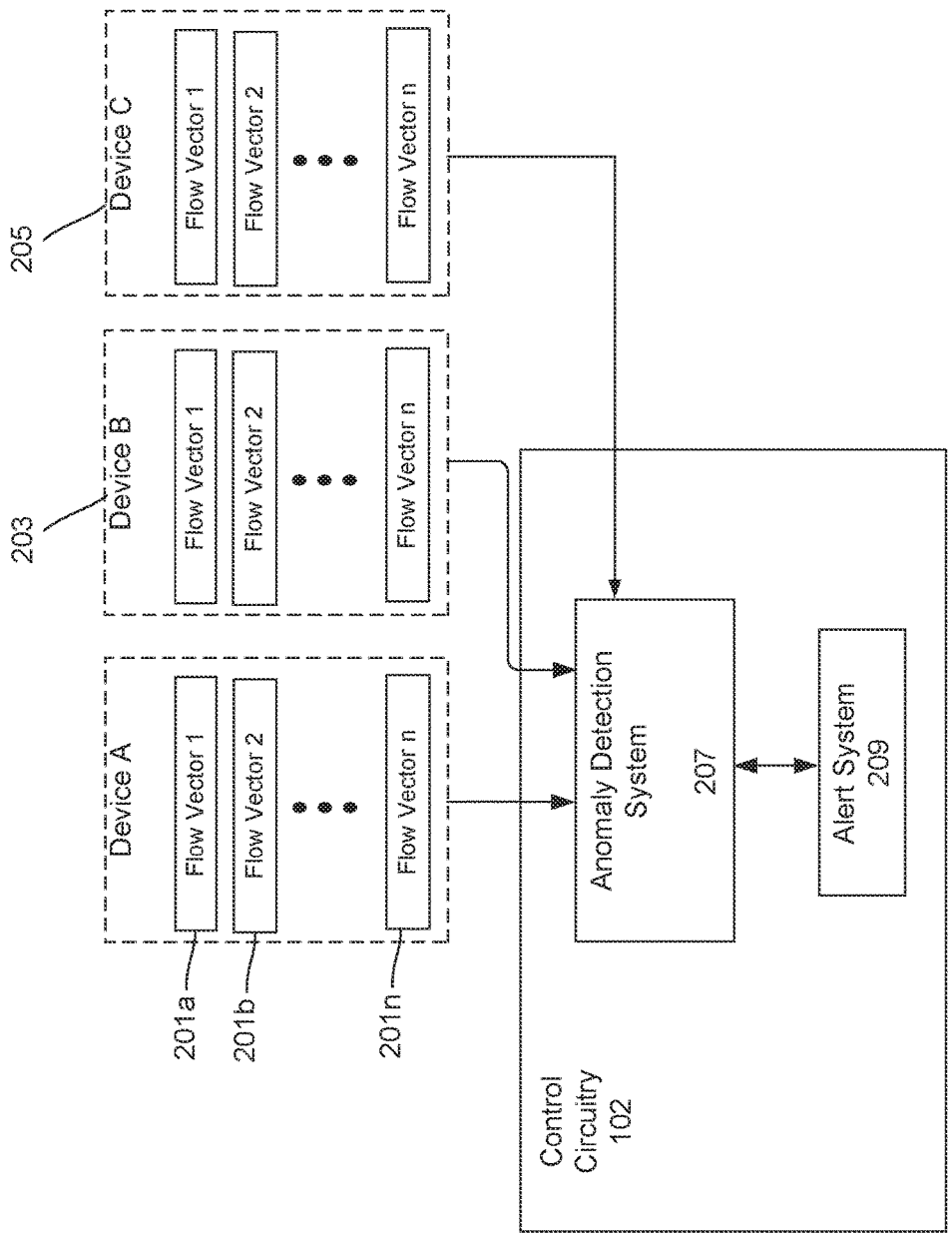
FIG. 2 illustrates a block diagram of system implementing anomaly detection using vector data, according to some embodiments of the disclosure.

FIG. 2 illustrates a block diagram of system 200 implementing anomaly detection using vector data, according to some embodiments of the disclosure. System 200 may be part of system 100 of FIG. 1. For example, as illustrated in FIG. 2, control circuitry 102 can include anomaly detection system 207 and alert system 209. Control circuitry 102 can receive and/or retrieve flow vector 201, 203, and 205 from, for example, storage circuitry 160 of FIG. 1. Illustrated systems are provided as exemplary parts of system 200, and system 200 can include other circuit(s) and subsystem(s). Also, although the systems of system 200 are illustrated as separate components, the embodiments of this disclosure can include any combination of these, less, or more components.

According to some aspects of the disclosure, anomaly detection system 207 and alert system 209 can be part of control circuitry 102. Additionally, or alternatively, anomaly detection system 207 and/or alert system 209 can be part of system 100 of FIG. 1 and can be separate from control circuitry 102. Also, control circuitry 102 can include more or less components/systems for performing the operations of this disclosure.

According to some aspects of this disclosure, one or more flow vectors 201 are associated with one or more network flows from and/or to a network device (e.g., device A such as network endpoint 112 of FIG. 1). Anomaly detection system 207 can receive and/or retrieve one or more flow vectors 201. A non-limiting example of four flow vectors 201*a-d* is illustrated in FIG. 3A. In this example, flow vectors 201*a-d* are associated with network flows of, for example, network device A. It is noted that number of flow vectors and their structures are provided in FIG. 3A as an example and they do not limit aspects of this disclosure.

In some examples, anomaly detection system 207 is configured to group the flow vectors (e.g., flow vectors 201) into one or more groups. For example, and as discussed in more detail below, anomaly detection system 207 is configured to group the flow vectors (and their associated network flows) that are more similar to one another than to a threshold. By grouping the flow vectors, anomaly detection system 207 can reduce the number of flow vectors. In one example, anomaly detection system 207 is configured to use a similarity measure and a similarity threshold to group flow vectors 201. In some examples, anomaly detection system 207 can use a cosine similarity measure as the similarity measure.

Figure 3B:
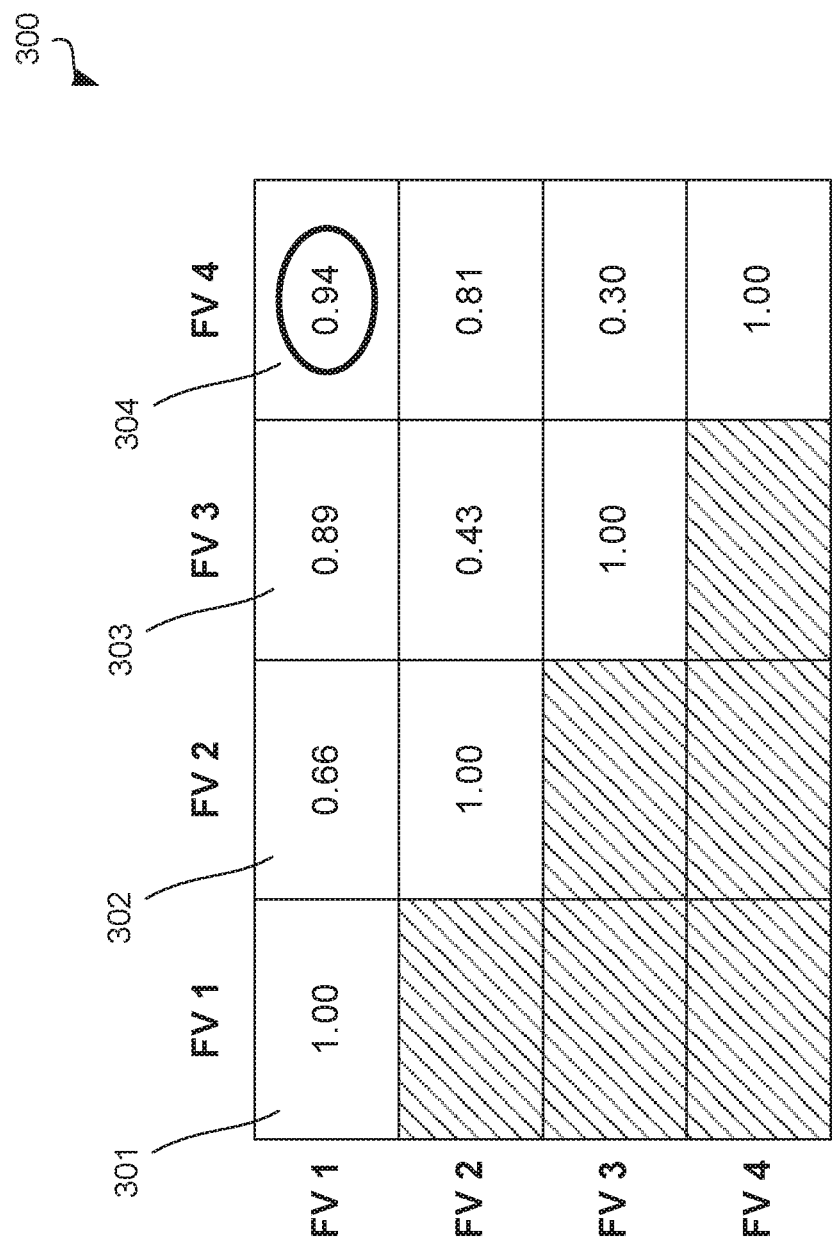
FIG. 3B illustrates an exemplary matrix that includes the values of pairwise cosine similarity measure of flow vectors, according to some embodiments.

According to some examples, cosine similarity measure can be a measure of similarity between two non-zero vectors of an inner product space that measures the cosine of the angle between them. In this example, anomaly detection system 207 can determine a pairwise cosine similarity measure between pairs of flow vectors 201. As a non-limiting example, one aspect of the grouping operation can be discussed with respect to FIGS. 3A and 3B. FIG. 3B illustrates one exemplary matrix 300 that includes the values of pairwise cosine similarity measure of flow vectors 201*a-d* of FIG. 3A.

For example, value 301 (value=1) is the cosine similarity value between flow vector 201*a* and itself. For example, value 302 (value=0.66) is the cosine similarity value between flow vector 201*a* and flow vector 201*b*. For example, value 303 (value=0.89) is the cosine similarity value between flow vector 201*a* and flow vector 201*c*. For example, value 304 (value=0.94) is the cosine similarity value between flow vector 201*a* and flow vector 201*d*. Similar cosine similarity values can be determined for other pairs of flow vectors. Cosine similarity value is in the range of [−1, +1], with −1 for completely different vectors and +1 for identical vectors. Matrix 300 is a square matrix, which is symmetrical. Therefore, half of the operations of determining a pairwise cosine similarity values between pairs of flow vectors can be skipped.

In some examples, the pairwise cosine similarity values can be efficiently vectorized by storing the flow vectors (e.g., flow vectors 201*a-d*) in a contiguous memory space M. In some examples, the following operation can output a square matrix C with each cell being the cosine similarity value between a pair of corresponding columns in M:

$$M = \frac{M}{\sqrt{\sum_{m \in M} m^2}}; C = MM^T$$

After determining the similarity values between the pairs of flow vectors, anomaly detection system 207 can determine which pairs of flow vectors are more similar to one another than to a similarity threshold. For example, anomaly detection system 207 can compare the determined similarity values to a similarity measure to determine which pairs of flow vectors are more similar to one another than to the similarity threshold. According to some examples, the similarity threshold can be a pre-configured threshold that can be set by a user (e.g., a network administrator). Additionally, or alternatively, the similarity threshold can be a configurable threshold configured by the user. In some examples, the similarity threshold can be set by anomaly detection system 207 and/or control circuitry 102 by analyzing flow vectors and network flows. For example, the similarity threshold can dynamically change based on the analysis by anomaly detection system 207 and/or control circuitry 102.

As a non-limiting example, and as illustrated in FIG. 3B, the similarity threshold can be 0.9. In this example, anomaly detection system 207 compares, for example, the similarity values 302, 303, and 304 (e.g., similarity values between flow vector 201*a* and flow vectors 201*b-d*) to similarity threshold 0.9. In this example, anomaly detection system 207 determines that flow vector 201*a* and flow vector 201*d* are more similar to one another than to the similarity threshold of 0.9.

As discussed above, FIGS. 3A and 3B are provided as examples and do not limit aspects of this disclosure. Also, using a cosine similarity measure for determining a similarity measure between two flow vectors is provided as one example. Other aspects of this disclosure can use other methods to determine a similarity measure between two vectors.

After determining the pairs of flow vectors that are more similar to one another than to the similarity threshold, anomaly detection system 207 can combine these pairs of flow vectors. For example, in the non-limiting example of FIG. 3B, after determine that flow vectors 201a and 201d are more similar to one another than to the similarity threshold, anomaly detection system 207 can combine flow vectors 201a and 201d into a new flow vector. According to some examples, combining two flow vectors can include merging the two flow vectors. For example, the merging the flow vectors can include determining (e.g., computing) an element-wise average of the two flow vectors. For example, merging flow vectors 201a and 201d can include element-wise average of flow vectors 201a and 201d (example elements of flow vectors 201a and 201d are illustrated in FIG. 3A).

In some aspects of the disclosure, the element-wise average of flow vectors can include weighted element-wise average of the flow vectors. In these examples, the weight in the weighted element-wise average can include the number of previous merges associated with each flow vector. As a non-limiting example, if flow vector 201a is a result of three merges and flow vector 201d is a result of five merges, then the weighted element-wise average of flow vectors 201a and 201d includes using a weight of three for elements of flow vector 201a and using a weight of five for elements of flow vector 201d.

Although some examples of this disclosure are discussed with respect to using element-wise average of flow vectors as one example of combining the flow vectors, aspects of this disclosure can use other methods for combining the flow vectors.

Returning to the non-limiting example of FIG. 3B, after determining the similarity values, comparing the similarity values with the similarity threshold, and combining flow vectors (e.g., merging flow vectors 201a and 201d), the number of flow vectors is reduced from four to three.

According to some aspects of this disclosure, by combining the flow vectors having similarity values more than the similarity threshold, anomaly detection system 207 is configured to generate one or more flow clusters for each network device each of network devices such as devices A, B, C, for example, network endpoints 112, 114). According to some examples, each flow cluster can represent the flow vectors that are more frequently observed for the network device. Additionally, each flow cluster can be timestamped with the time that the last flow vector was combined (e.g., merged) into it. In some examples, anomaly detection system 207 can use the similar methods discussed above to combine the flow vector into a corresponding flow cluster. In other words, anomaly detection system 207 can determine similarity values between the flow vector and the flow clusters associated with the network device, can compare the similarity values to a similarity threshold, and combine flow vector with a flow cluster being more similar to one another than to the similarity threshold. The time that the last flow vector was combined (e.g., merged) with its corresponding flow cluster can be stored with the flow cluster as a timestamp, according to some examples.

In some examples, the flow clusters can be determined by anomaly detection system 207, control circuitry 102, and/or processing systems 150. The flow clusters can be stored, for example, in storage circuitry 160.

A non-limiting example of four flow clusters 201a-d is illustrated in FIG. 4A. In this example, flow clusters 401a-d are associated with network flows of, for example, network device A. It is noted that number of flow clusters and their structures are provided in FIG. 4A as an example and they do not limit aspects of this disclosure. As illustrated in FIG. 4A, each flow cluster can have a correspond timestamp 403a-d, as discussed above.

In some examples, anomaly detection system 207 can periodically detect and delete the flow cluster(s) with a timestamp that is older than a maximum age threshold. For example, after a time period T, anomaly detection system 207 can examine the timestamp associated with each flow cluster, compare a difference of the timestamp to the current time with a maximum age threshold, and delete the flow cluster having a timestamp older than the maximum age threshold.

According to some aspects of this disclosure, anomaly detection system 207 is configured to use the flow clusters associated with a network device to determine any anomaly with the behavior of that network device. For example, anomaly detection system 207 is configured to receive and/or retrieve a flow vector associated with the network device (e.g., device A such as network endpoint 112). In some examples, anomaly detection system 207 can receive and/or retrieve the flow vector from storage circuitry 160. In some examples, the received (and/or retrieved) flow vector is a flow vector previously generated by combining two or more other flow vectors.

In some examples, anomaly detection system 207 can determine, using a similarity measure, one or more similarity values between the flow vector and one or more flow clusters. In some examples, the similarity measure can include a cosine similarity measure for determining the similarity values between the flow vector and the one or more flow clusters. However, other aspects of this disclosure can use other methods to determine the similarity value between two vectors (e.g., between the flow vector and the one or more flow clusters).

Figure 4B:
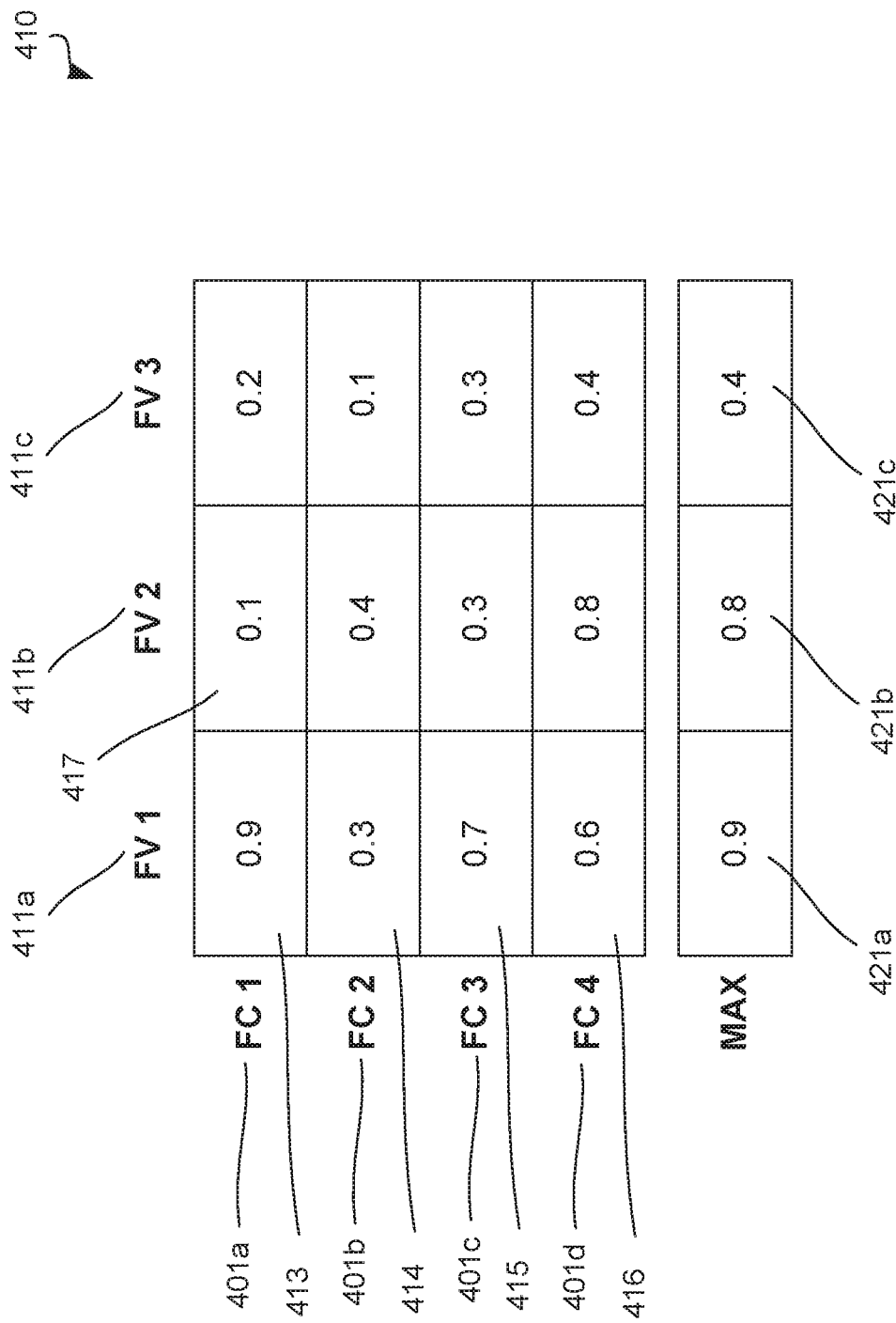
FIG. 4B illustrates an exemplary matrix that includes the values of pairwise cosine similarity measure of flow vectors with flow dusters, according to some embodiments.

According to some aspects, anomaly detection system 207 can determine similarity values between one or more flow vectors of the network device with one or more flow clusters of the network device. For example, FIG. 4B illustrates one exemplary matrix 410 that includes the values of pairwise cosine similarity measure of flow vectors 411a-c (FV1-FV3) with flow clusters 401a-d (FC1-FC4).

For example, value 413 (value=0.9) is the cosine similarity value between flow vector 411a and flow cluster 401a. For example, value 414 (value=0.3) is the cosine similarity value between flow vector 411a and flow cluster 401b. For example, value 415 (value=0.7) is the cosine similarity value between flow vector 411a and flow cluster 401c. For example, value 416 (value=0.6) is the cosine similarity value between flow vector 411a and flow cluster 401d. For example, value 417 (value=0.1) is the cosine similarity value between flow vector 411b and flow cluster 401a. Similar cosine similarity values can be determined for other pairs of flow vector and flow cluster.

According to some aspects, after determining, using the similarity measure, the one or more similarity values between the flow vector and the one or more flow clusters, anomaly detection system 207 can determine a maximum similarity value as a maximum of the one or more similarity values. According to some examples, anomaly detection system 207 can be configured to determine the maximum similarity value of each of the flow vectors that anomaly detection system 207 receives (and/or retrieves). For example, as illustrated in FIG. 4B, anomaly detection system 207 is configured to determine the maximum similarity value for each column of table 410. For example, anomaly detection system 207 can determine the maximum value

421*a* (value=0.9) associated with flow vector 411*a*. For example, anomaly detection system 207 can determine the maximum value 421*b* (value=0.8) associated with flow vector 411*b*. For example, anomaly detection system 207 can determine the maximum value 421*c* (value=0.4) associated with flow vector 411*c*.

According to some aspects of the disclosure, anomaly detection system 207 can be configured to perform additional operation(s) on each determined maximum similarity value for each flow vector. In one example, anomaly detection system 207 can perform a quantile sketch algorithm on the maximum similarity value(s), In some examples, quantile sketch algorithm can be a stochastic streaming sketch that enables near-real time analysis of the approximate distribution of comparable values from a very large stream in a single pass. In some examples, the quantile sketch algorithm used by anomaly detection system 207 can include a DDSketch algorithm. DDSketch algorithm can include a fully mergeable, relative-error quantile sketching algorithm with formal guarantees, according to some aspects of this disclosure, By applying the quantile sketch algorithm, anomaly detection system 207 can generate quantiles with high accuracy while operating within storage requirements. It is noted that DDSketch algorithm is one exemplary algorithm that anomaly detection system 207 can perform. The embodiments of this disclosure are not limited to this algorithm and anomaly detection system 207 can use other suitable algorithms According to some aspects of this disclosure, anomaly detection system 207 can use the generated quantiles and a minimum confidence threshold to generate an anomaly threshold. As discussed in more detail below, the anomaly threshold can be used to determine whether the flow vector represents an anomaly in the behavior of the network device. In some examples, the minimum confidence threshold can be provided to anomaly detection system 207 by, for example, a user (e.g., a network administrator). The minimum confidence threshold can be specific to the network, to the network devices, and/or to the types of network flows. Additionally, or alternatively, anomaly detection system 207 can determine the minimum confidence threshold by analyzing the network, the network devices, and/or the network flows. In some examples, the minimum confidence threshold can be used as a threshold for confidence in the alerts to be generated. For example, the minimum confidence threshold indicates the confidence that anomaly detection system 207 has that a given alert is a true positive. As a non-limiting example, the minimum confidence threshold is a value between 0 and 1. A minimum confidence threshold of 0 can indicate that every network flow generates an alert. A minimum confidence threshold of 1 can indicate that an alert is generated if anomaly detection system 207 is confident that the corresponding flow is anomalous.

According to some examples, the anomaly threshold can be a pre-configured threshold that can be set by a user (e.g., a network administrator). For example, anomaly detection system 207 can receive the anomaly threshold from the user. Additionally, or alternatively, the anomaly threshold can be a configurable threshold configured by the user. In some examples, the anomaly threshold can be set by anomaly detection system 207 and/or control circuitry 102 by analyzing flow vectors and network flows. For example, the anomaly, threshold can dynamically change based on the analysis by anomaly detection system 207 and/or control circuitry 102. For example, anomaly detection system 207 and/or control circuitry 102 can dynamically update the anomaly threshold based on at least one of the flow associated with the network device or the behavior of the network device.

According to some aspects of the disclosure, anomaly detection system 207 can further compare the maximum similarity value(s) (and/or the generated quantile(s)) to the anomaly threshold to determine whether the flow vector represents an anomaly in the behavior of the network device. For example, if the maximum similarity value is less than the anomaly threshold, anomaly detection system 207 can determine (e.g., detect) an anomaly in the behavior of the network device. In response to detecting anomaly, anomaly detection system 207 can use alert system 209 and/or API 170 to alert, for example, a network administrator that an anomaly has been detected in the behavior of the network device. Additionally, or alternatively, in response to detecting the anomaly, anomaly detection system 207 can generate a new flow cluster based on the flow vector and associate a timestamp to the new flow cluster. The timestamp can indicate a time that the new flow cluster is generated.

If the maximum similarity value is equal to or greater than the anomaly threshold, anomaly detection system 207 can update the flow cluster associated with the maximum similarity value. For example, anomaly detection system 207 can combine (e.g., merge) the flow vector with the flow cluster associated with the maximum similarity value. In some examples, the combining can include determine an exponentially weighted moving average between the flow vector and the flow cluster associated with the maximum similarity value. However, other methods can be used for combining the flow vector with the flow cluster associated with the maximum similarity value. Additionally, or alternatively, anomaly detection system 207 can update a timestamp associated with the flow cluster associated with the maximum similarity measure. The updated timestamp can indicate a time that the flow cluster associated with the maximum similarity value is updated.

As a non-limiting example, the anomaly threshold of 0.55 is considered in FIG. 4B. In this non-limiting example, the maximum similarity values 421*a* and 421*b* are greater than anomaly threshold 0.55. In this example, maximum similarity value 421*a* is associated with flow cluster 401*a*. In this example, flow cluster 401*a* is updated by combining flow cluster 401*a* with flow vector 411*a*. In some example, the combining includes determining an exponentially weighted moving average between flow vector 411*a* and the flow cluster 401*a*, The exponentially weighted moving average can be (0.9*FC 1+0.1*FV 1). Additionally, maximum similarity value 421*b* is associated with flow cluster 401*d*. In this example, flow cluster 401*d* is updated by combining flow cluster 401*d* with flow vector 411*b*. In some example, the combining includes determining an exponentially weighted moving average between flow vector 411*b* and the flow cluster 401*d*. The exponentially weighted moving average can be (0.8*FC 4+0.2*FV 2).

According to some aspects of this disclosure, if a network device is a new device in the network (e.g., network 110) and system 100 has not fully developed the flow clusters of the new device, anomaly detection system 207 can be configured to develop the flow clusters as discussed above. In some examples, if anomaly detection system 207 does not find a flow cluster that is similar to a receive flow vector for the new device, that can be because the flow clusters are not fully developed yet. In these examples, for a given number of detected anomalies, anomaly detection system 207 may not generate alerts but develop the flow clusters. This given number of detected anomalies can be specific to the network, the network device, the network flows, etc.

According to some aspects of this disclosure, system 100, control circuitry 102, and/or anomaly detections system 207 can detect anomalies in network behavior to provide fine-grained root explanation. For example, the methods and systems of this disclosure can identify which network flows are unusual at a given point in time for a specific network device using, for example, the network device's previous history. Additionally, or alternatively, the systems and methods of this disclosure can operate within specific memory/storage requirements while providing anomaly detection. These systems can enable "commodity hardware" to operate the anomaly detection methods on a large installed base. Additionally, or alternatively, the methods and systems of this disclosure can provide the end-user a simple way to specify a minimum confidence of the alerts being generated by, for example, providing the anomaly threshold. In some examples, the systems and methods of this disclosure can dynamically adjust the confidence sensitivity based on the behavior of the network, the behavior of the network device, the network data being ingested, etc. rather than relying on hardcoded parameters.

In a non-limiting example, the anomaly detection systems and methods of this disclosure can be applied to networks having Internet of Things ("IoT") devices as endpoint devices. Additionally, or alternatively, aspects of this disclosure can be used for networks in enterprises where employees use their personal devices network endpoints (e.g., "Bring Your Own Device"). Aspects of this disclosure can be used for early detection of anomaly with flow level and/or device level detection. In some case, the anomaly can be based on security attacks, malware, ransomware, etc. on the network devices. Aspects of this disclosure can detect these security attacks by monitoring the network devices at a flow level and provide alerts and/or protective solutions.

Figure 5:
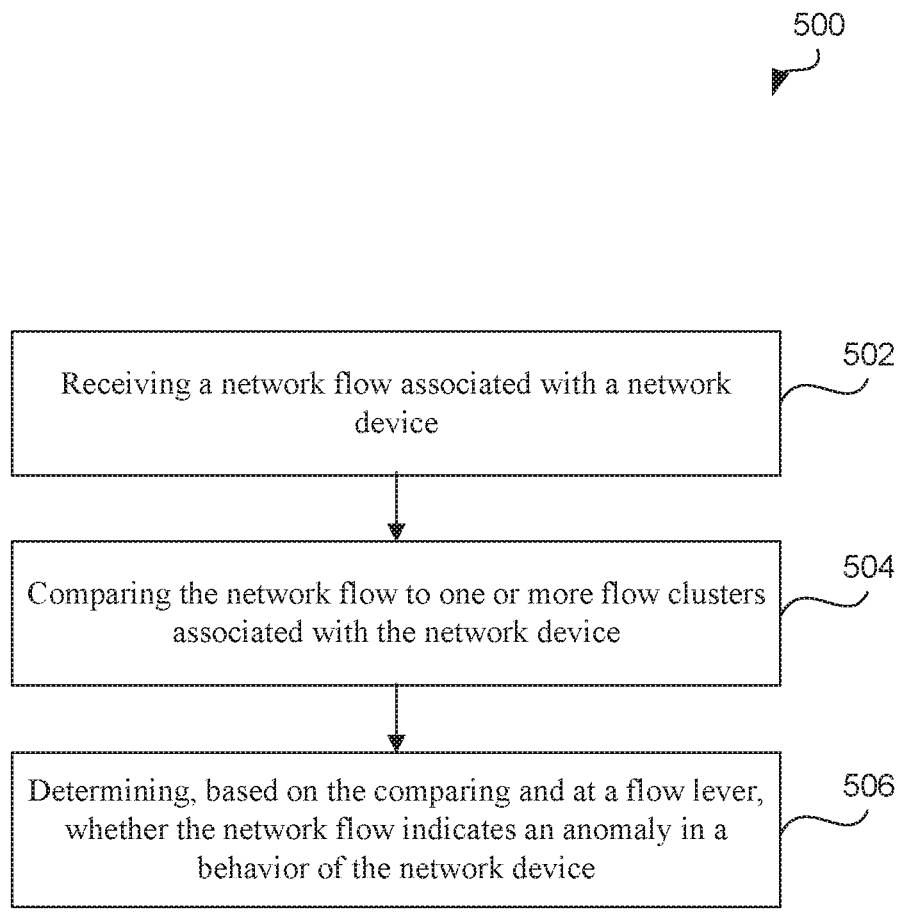
FIG. 5 is a flowchart illustrating example operations for detecting an anomaly in a behavior of a network device, according to some embodiments of the disclosure.

FIG. 5 illustrates an example method 500 for detecting an anomaly in a behavior of a network device, according to some embodiments of the disclosure. As a convenience and not a limitation, FIG. 5 may be described with regard to elements of FIGS. 1-4. Method 500 may represent the operation of a system (e.g., control circuitry 102 and/or anomaly detection system 207) implementing anomaly detection methods of this disclosure. Method 500 may also be performed by computer system 800 of FIG. 8. But method 500 is not limited to the specific embodiments depicted in those figures, and other systems may be used to perform the method as will be understood by those skilled in the art. It is to be appreciated that not all operations may be needed, and the operations may not be performed in the same order as shown in FIG. 5.

At 502, a network flow associated with a network device is received. For example, control circuitry 102 and/or anomaly detection system 207 receives the network flow associated with the network device (e.g., network endpoint 112). At 504, the network flow is compared to one or more flow clusters associated with the network device. For example, control circuitry 102 and/or anomaly detection system 207 compares the received network flow and/or one or more parameters associated with the network flow) to one or more flow clusters.

At 506, it is determined, based on the comparing and at a flow level, whether the network flow indicates an anomaly in a behavior of the network device. For example, control circuitry 102 and/or anomaly detection system 207 can use the results of the comparison to determine whether an anomaly has occurred. In some examples, in response to determining that the network flow indicates the anomaly in the behavior of the network device, control circuitry 102 and/or anomaly detection system 207 can update one of the one or more flow clusters and can update a timestamp associated with the updated flow cluster. The updated timestamp can indicate a time that the flow cluster is updated. In some examples, in response to determining that the network flow does not indicate the anomaly in the behavior of the network device, control circuitry 102 and/or anomaly detection system 207 can generate a new flow cluster based on the received network flow and associate a timestamp to the new flow cluster. The timestamp can indicate a time that the new flow cluster is generated.

Figure 6:
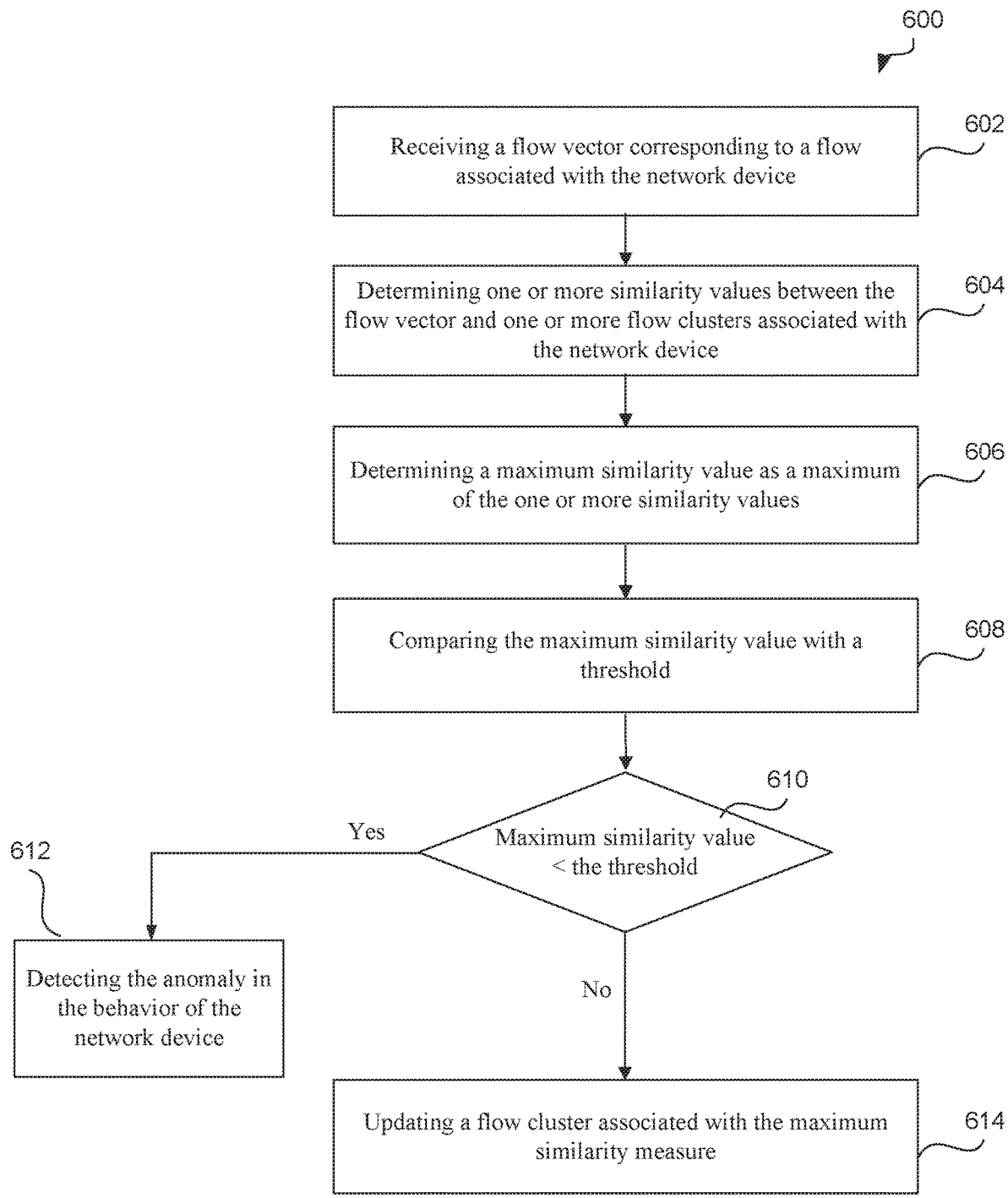
FIG. 6 is a flowchart illustrating example operations for an anomaly detection system detecting an anomaly in a behavior of a network device, according to some embodiments of the disclosure.

One example of steps 502-506 is further discussed with respect to FIG. 6.

FIG. 6 illustrates an example method 600 for an anomaly detection system detecting an anomaly in a behavior of a network device, according to some embodiments of the disclosure. As a convenience and not a limitation, FIG. 6 may be described with regard to elements of FIGS. 1-5. Method 600 may represent the operation of a system (e.g., control circuitry 102 and/or anomaly detection system 207) implementing anomaly detection methods of this disclosure, Method 600 may also be performed by computer system 800 of FIG. 8. But method 600 is not limited to the specific embodiments depicted in those figures and other systems may be used to perform the method as will be understood by those skilled in the art. It is to be appreciated that not all operations may be needed, and the operations may not be performed in the same order as shown in FIG. 6.

At 602, a flow vector corresponding to a flow associated with a network device is received. For example, anomaly detections system 207 retrieves and/or receives the flow vector corresponding to the flow associated with the network device, According to some embodiments, the received flow vector can be a combination of two or more flow vectors.

At 604, one or more similarity values between the flow vector and one or more flow clusters associated with the network device are determined. For example, anomaly detection system 207 determine the similarity values using a similarity measure. In some examples, the similarity measure can be a cosine similarity measure.

At 606, a maximum similarity value is determined as a maximum of the one or more similarity values. For example, anomaly detections system 207 can determine which one of the one or more flow clusters is more similar than the others to the received flow vector. At 608, the maximum similarity value is compared to a threshold (e.g., the anomaly threshold discussed above.) In some examples, anomaly detection system 207 (and/or system 100) can receive the threshold from, for example, a user (e.g., a network administrator). Additionally, or alternatively, the threshold can be dynamically updated based on at least one of the flow associated with the network device or a behavior of the network device.

At 610, it is determined whether the maximum similarity value is less than the threshold. In response to the maximum similarity measure being less than the threshold, method 600 moves to 612. At 612, it is determined that there is an anomaly in the network device. For example, anomaly detection system 207 detects the anomaly in the behavior of the network device. In some examples, detecting the anomaly in the behavior of the network device can include generating a new flow cluster based on the flow vector. Also, the detecting can include associating a timestamp to the new flow duster. The timestamp can indicate a time that the new flow cluster is generated. Anomaly detection system 207 can generate the new flow cluster and associate the timestamp after detecting the anomaly, according to some examples. After detecting the anomaly (or as part of the anomaly detection process), anomaly detection system 207 (alone or in combination with alert system 209 and/or API 170) can generate an alert (e.g., an alert message). The alert can be sent to, for example, one or more network users, one or more network administrators, one or more network devices, the device with detected anomaly, or the like. In some examples, the alert is based on the detected anomaly. For example, the alert can include information associated with the network device with the anomaly, information associated with the flow that triggered the anomaly, information about the flow vector and/or flow cluster that triggered the anomaly, one or more timestamps, etc.

Returning to 610, in response to the maximum similarity value being equal to or greater than the threshold, method 600 moves to 614. At 614, a flow cluster associated with the maximum similarity value is updated. For example, anomaly detection system 207 can combine the received flow vector with the flow cluster associated with the maximum similarity value. The combining can include determining an exponentially weighted moving average between the flow vector and the flow cluster associated with the maximum similarity value. The combining can also include updating a timestamp associated with the flow cluster associated with the maximum similarity value. The updated timestamp can indicate a time that the flow cluster associated with the maximum similarity value is updated. In some examples, anomaly detection system 207 can update the timestamp after combining the received flow vector with the flow cluster associated with the maximum similarity value.

According to some aspects of the disclosure, method 600 can be performed each time anomaly detection system 207 receives a flow vector for each network device. Additionally, or alternatively, method 600 can be performed when anomaly detection system 207 receives a number of flow vectors that is more than a threshold. In some aspects, method 600 can be performed based on a time period.

Figure 7:
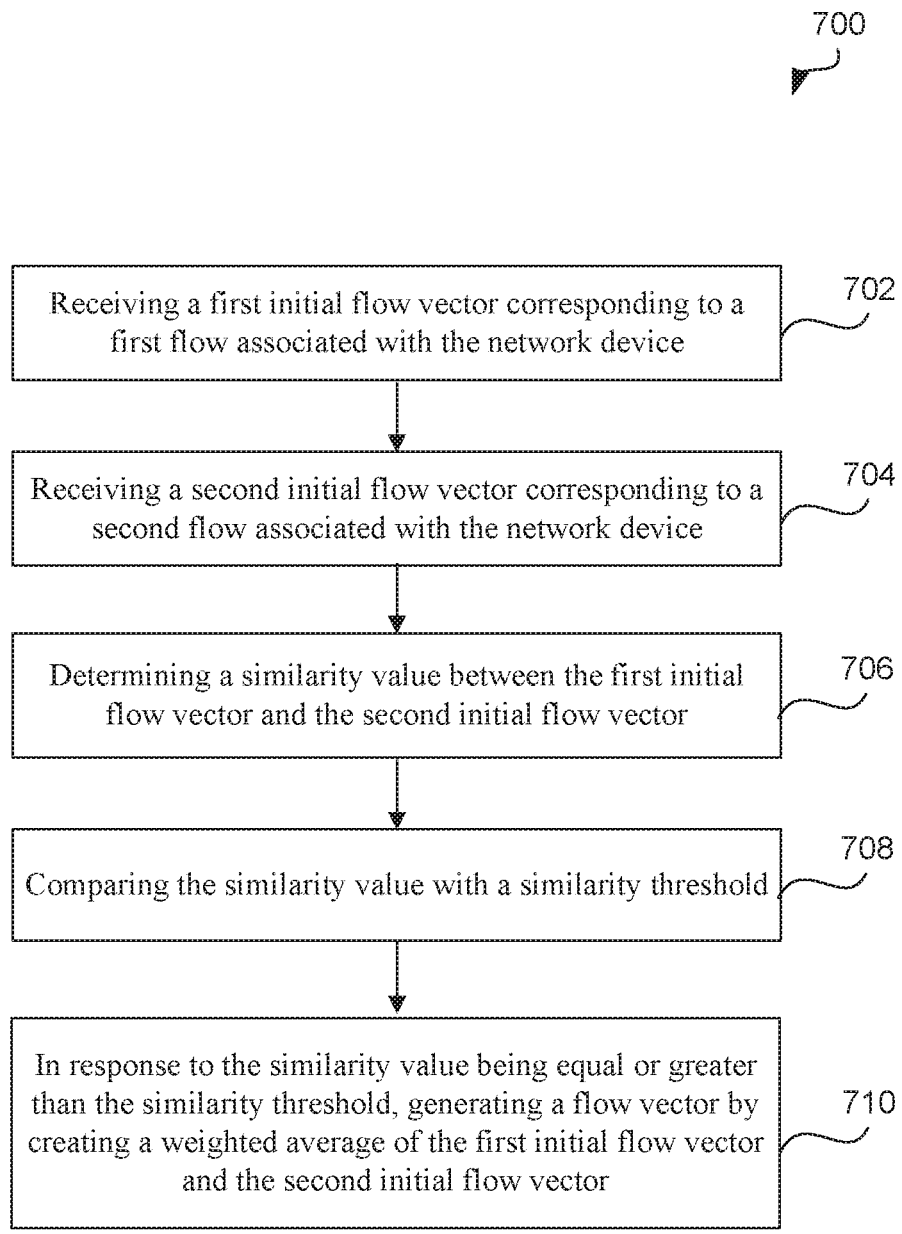
FIG. 7 is a flowchart illustrating example operations for an anomaly detection system generating a flow vector based on two or more flow vectors, according to some embodiments of the disclosure.

FIG. 7 illustrates an example method 700 for an anomaly detection system generating a flow vector based on two or more flow vectors, according to some embodiments of the disclosure. As a convenience and not a limitation, FIG. 7 may be described with regard to elements of FIGS. 1-6. Method 700 may represent the operation of a system (e.g., control circuitry 102 and/or anomaly detection system 207) implementing anomaly detection methods of this disclosure. Method 700 may also be performed by computer system 800 of FIG. 8. But method 700 is not limited to the specific embodiments depicted in those figures and other systems may be used to perform the method as will be understood by those skilled in the art. It is to be appreciated that not all operations may be needed, and the operations may not be performed in the same order as shown in FIG. 7. According to some examples, method 700 can be performed as part of step 602 of method 600 of FIG. 6.

For example, at 702, a first initial flow vector corresponding to a first flow associated with a network device is received. For example, anomaly detection system 207 receives and/or retrieves the first initial flow vector (e.g., flow vector 201a) corresponding to a first flow associated with a network device (e.g., device A, such as network endpoint 112).

At 704, a second initial flow vector corresponding to a second flow associated with the network device is received. For example, anomaly detection system 207 receives and/or retrieves the second initial flow vector flow vector 201d) corresponding to a second flow associated with the network device (e.g., device A, such as network endpoint 112).

At 706, a similarity value between the first initial flow vector and the second initial flow vector is determined. For example, anomaly detection system 207 determines a similarity value (using for example cosine similarity measure) between the first initial flow vector (e.g., flow vector 201a) and the second initial flow vector (e.g., flow vector 201d).

At 708, the similarity value is compared to a similarity threshold. For example, anomaly detection system 207 compares the determined similarity value to the similarity threshold. At 710, in response to the similarity value being equal to or greater than the similarity threshold, a flow vector is generated. For example, anomaly detection system 207 generates the flow vector in response to the similarity value being equal to or greater than the similarity threshold. As discussed above, in some examples, generating the flow vector can include combining (e.g., creating a weighted average of) the first initial flow vector and the second initial flow vector. In some examples, the first and second initial flow vectors are stored in contiguous memory spaces in, for example, storage circuitry 160 of FIG. 1.

Figure 8:
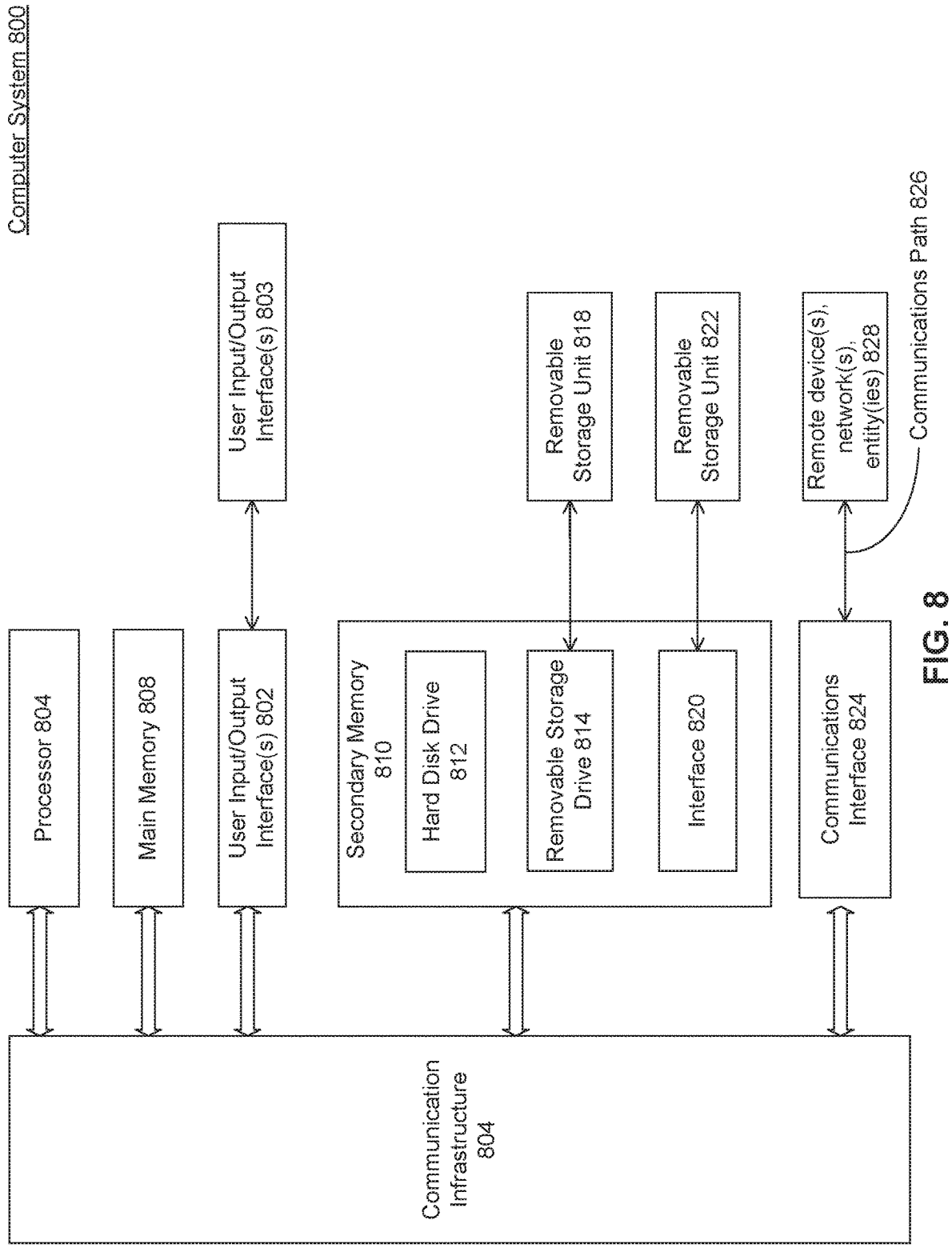
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any aspect of the disclosure discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include customer input/output device(s) 803, such as monitors, keyboards, pointing devices, etc., which may communicate with communication infrastructure 806 through customer input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components; instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot; and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation; laptop or notebook computer, netbook, tablet; smart phone; smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML, User interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method performed by an anomaly detection system for detecting an anomaly in a network device, the method comprising:
receiving, by at least one processor of the anomaly detection system, two or more initial flow vectors, wherein the two or more initial flow vectors are based on a behavioral model of the network device generated based on processing a plurality of records associated with the network device, and wherein the two or more initial flow vectors are stored in a memory;
generating, by at the least one processor of the anomaly detection system and based on the two or more initial flow vectors, a flow vector corresponding to the network device, wherein the flow vector is stored in the memory;
determining, by the at least one processor of the anomaly detection system, a plurality of similarity values between the flow vector and a plurality of flow clusters associated with the network device;
determining, by the at least one processor of the anomaly detection system, a maximum similarity value as a maximum of the plurality of similarity values;
comparing, by the at least one processor of the anomaly detection system, the maximum similarity value to a threshold;
in response to the maximum similarity value being equal to or greater than the threshold, updating, by the at least one computer processor of the anomaly detection system, a flow cluster associated with the maximum similarity value by combining the flow cluster associated with the maximum similarity value with the flow vector, wherein the updated flow cluster is stored in the memory for subsequent anomaly detection; and
in response to the maximum similarity value being less than the threshold:
detecting the anomaly in the network device;
generating an alert message based on the detected anomaly; and
generating a new flow cluster based on the flow vector, wherein the new flow cluster is stored in the memory for the subsequent anomaly detection.

2. The method of claim 1, wherein the combining the flow cluster associated with the maximum similarity value with the flow vector comprises:
determining an exponentially weighted moving average between the flow vector and the flow cluster associated with the maximum similarity value; and
updating a timestamp associated with the flow cluster associated with the maximum similarity value, wherein the updated timestamp indicates a time that the flow cluster associated with the maximum similarity value is updated.

3. The method of claim 1, further comprising associating a timestamp with the new flow cluster, the timestamp indicating a time that the new flow cluster is generated.

4. The method of claim 1, wherein the determining the plurality of similarity values comprises applying a cosine similarity measure to the plurality of similarity values.

5. The method of claim 1, wherein:
the receiving the two or more initial flow vectors further comprises:
receiving a first initial flow vector corresponding to a first flow associated with the network device; and
receiving a second initial flow vector corresponding to a second flow associated with the network device, and the generating the flow vector further comprises:
determining a similarity value between the first initial flow vector and the second initial flow vector;
comparing the similarity value to a similarity threshold; and
in response to the similarity value being equal to or greater than the similarity threshold, generating the flow vector.

6. The method of claim 5, wherein the generating the flow vector comprises creating a weighted average of the first initial flow vector and the second initial flow vector.

7. The method of claim 5, wherein the first and second initial flow vectors are stored in contiguous memory spaces in the memory.

8. The method of claim 1, further comprising:
receiving the threshold used for detecting the anomaly in the network device.

9. The method of claim 1, further comprising:
dynamically updating the threshold based on at least one of a flow associated with the network device or a behavior of the network device.

10. A method performed by an anomaly detection system, comprising:
receiving, by at least one processor of the anomaly detection system, two or more initial flow vectors, wherein the two or more initial flow vectors are based on a behavioral model of a network device generated based on processing a plurality of records associated with the network device, and wherein the two or more initial flow vectors are stored in a memory;
generating, by the at least one processor of the anomaly detection system and based on the two or more initial flow vectors, a network flow associated with the network device, wherein the network flow is stored in the memory;
determining, by the at least one processor of the anomaly detection system, a plurality of similarity values between the network flow and a plurality of flow clusters associated with the network device;
determining, by the at least one processor of the anomaly detection system, a maximum similarity value as a maximum of the plurality of similarity values;
comparing, by the at least one processor of the anomaly detection system, the maximum similarity value to a threshold;
determining, by the at least one processor of the anomaly detection system and based on the comparing and at a flow level, whether the network flow indicates an anomaly in a behavior of the network device;
in response to determining that the network flow indicates the anomaly in the behavior of the network device:
generating an alert message based on the anomaly, wherein the alert message comprises at least one or more of information associated with the network device with the anomaly, information associated with the network flow that triggered the anomaly, information about a flow vector, or information associated with a flow cluster associated with the maximum similarity value; and
generating a new flow cluster based on the received network flow, wherein the new flow cluster is stored in the memory for subsequent anomaly detection; and
in response to determining that the network flow does not indicate the anomaly in the behavior of the network device, updating one of the plurality of flow clusters by combining the one of the plurality of flow clusters with a flow vector associated with the network flow, wherein the updated one of the plurality of flow clusters is stored in the memory for the subsequent anomaly detection.

11. The method of claim 10, further comprising:
updating a timestamp associated with the updated flow cluster, wherein the updated timestamp indicates a time that the one of the plurality of flow clusters is updated.

12. The method of claim 10, further comprising:
associating a timestamp with the new flow cluster, the timestamp indicating a time that the new flow cluster is generated.

13. A system, comprising:
a memory; and
at least one processor coupled to the memory and configured to:
receive two or more initial flow vectors, wherein the two or more initial flow vectors are based on a behavioral model of a network device generated based on processing a plurality of records associated with the network device, and wherein the two or more initial flow vectors are stored in the memory;
generate, by the at least one processor and based on the two or more initial flow vectors, a flow vector associated with the network device, wherein the flow vector is stored in the memory;
determine a plurality of similarity values between the flow vector associated with the network device and a plurality of flow clusters associated with the network device;
determine a maximum similarity value as a maximum of the plurality of similarity values;
compare the maximum similarity value to a threshold;
in response to the maximum similarity value being equal to or greater than the threshold, update a flow cluster associated with the maximum similarity value by combining the flow cluster associated with the maximum similarity value with the flow vector, wherein the updated flow cluster is stored in the memory for subsequent anomaly detection; and
in response to the maximum similarity value being less than the threshold:
detect an anomaly in the network device;
generate an alert message based on the detected anomaly; and
generate a new flow cluster based on the flow vector, wherein the new flow cluster is stored in the memory for the subsequent anomaly detection.

14. The system of claim 13, wherein to combine the flow cluster associated with the maximum similarity value with the flow vector, the at least one processor is configured to:
determine an exponentially weighted moving average between the flow vector and the flow cluster associated with the maximum similarity value; and
update a timestamp associated with the flow cluster associated with the maximum similarity value, wherein the updated timestamp indicates a time that the flow cluster associated with the maximum similarity value is updated.

15. The system of claim 13, wherein the at least one processor is further configured to:
associate a timestamp with the new flow cluster, the timestamp indicating a time that the new flow cluster is generated.

16. The system of claim 13, wherein the at least one processor is further configured to dynamically update the threshold based on at least one of a flow associated with the network device or a behavior of the network device.

17. The system of claim 13, wherein to determine the plurality of similarity values, the at least one processor is configured to apply a cosine similarity measure to the plurality of similarity values.

18. The system of claim 13, wherein the at least one processor is further configured to dynamically update the threshold based on a flow associated with the network device.

19. The system of claim 13, wherein:
to receive the two or more initial flow vectors, the at least one processor is further configured to:
receive a first initial flow vector corresponding to a first flow associated with the network device; and
receive a second initial flow vector corresponding to a second flow associated with the network device, and
to generate the flow vector, the at least one processor is further configured to:
determine a similarity value between the first initial flow vector and the second initial flow vector;
compare the similarity value to a similarity threshold; and
in response to the similarity value being equal to or greater than the similarity threshold, generate the flow vector.

20. The system of claim 19, wherein to generate the flow vector, the at least one processor is configured to create a weighted average of the first initial flow vector and the second initial flow vector.

* * * * *

UNITED STATES PATENT AND TRADEMARK OFFICE
CERTIFICATE OF CORRECTION

PATENT NO. : 11,824,876 B2
APPLICATION NO. : 16/778585
DATED : November 21, 2023
INVENTOR(S) : Bernardi et al.

It is certified that error appears in the above-identified patent and that said Letters Patent is hereby corrected as shown below:

In the Specification

In Column 2, Line 67, delete "embodiments," and insert -- embodiments. --, therefor.

In Column 3, Line 5, delete "dusters," and insert -- clusters, --, therefor.

In Column 3, Line 8, delete "disclosure," and insert -- disclosure. --, therefor.

In Column 3, Line 32, delete "data," and insert -- data. --, therefor.

In Column 9, Line 42, after "device", insert -- (e.g., --.

In Column 11, Line 12, delete "value(s)," and insert -- value(s). --, therefor.

In Column 11, Line 22, delete "disclosure," and insert -- disclosure. --, therefor.

In Column 14, Line 23, delete "disclosure," and insert -- disclosure. --, therefor.

In Column 14, Line 35, delete "device," and insert -- device. --, therefor.

In Column 14, Line 65, delete "duster." and insert -- cluster. --, therefor.

In Column 15, Line 67, delete "vector flow" and insert -- vector (e.g., flow --, therefor.

In Column 17, Line 5, delete "components;" and insert -- components, --, therefor.

In Column 17, Line 29, delete "workstation;" and insert -- workstation, --, therefor.

Signed and Sealed this
Ninth Day of January, 2024

Katherine Kelly Vidal
*Director of the United States Patent and Trademark Office*

In Column 17, Line 30, delete "tablet;" and insert -- tablet, --, therefor.

In Column 17, Line 30, delete "phone;" and insert -- phone, --, therefor.